Patented Feb. 8, 1949

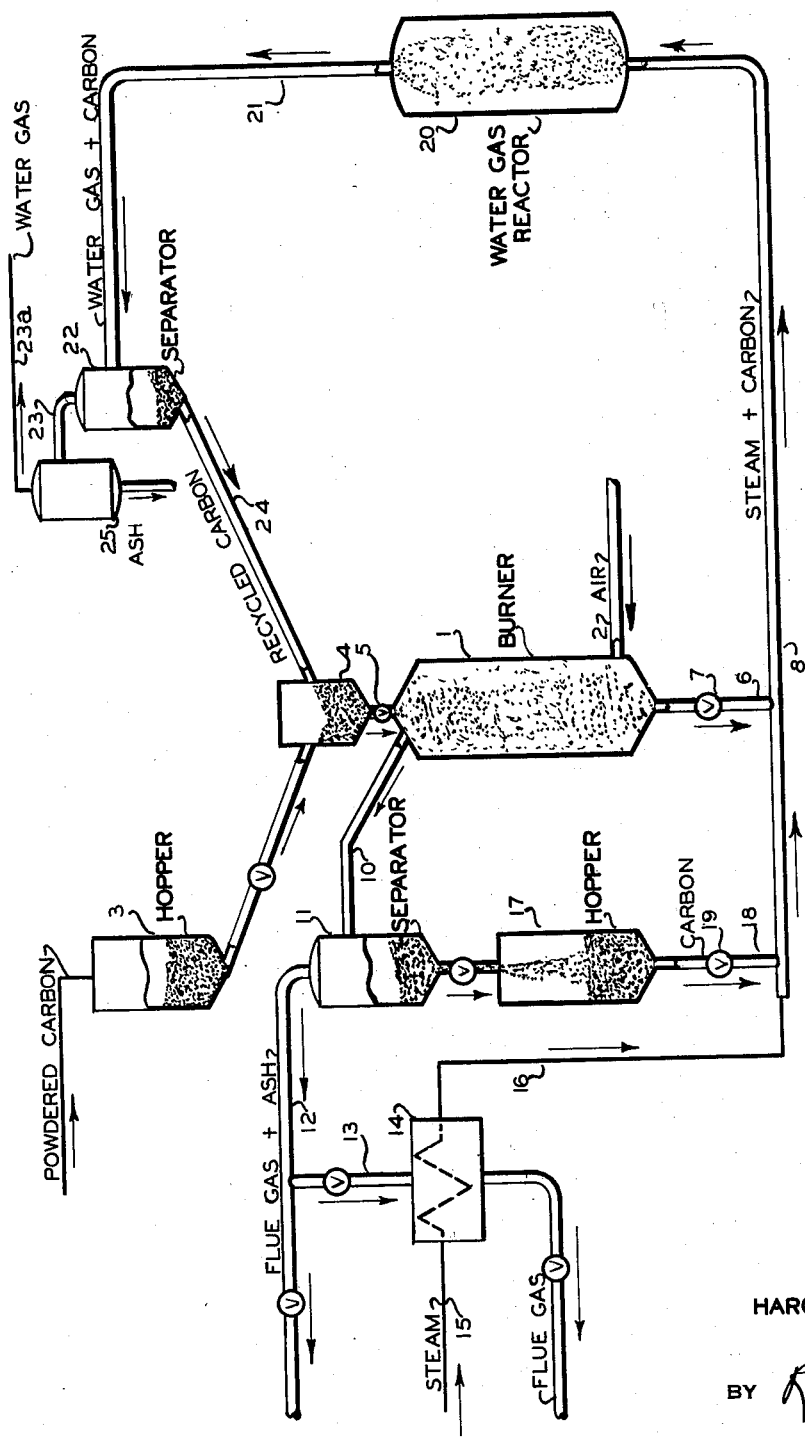

2,461,021

UNITED STATES PATENT OFFICE 2,461,021

MANUFACTURE OF WATER GAS

Harold V. Atwell, Beacon, N. Y., assignor to The Texas Company, New York, N. Y., a corporation of Delaware Application July 24, 1943, Serial No. 496,012

4 Claims. (Cl. 48—206)

This invention relates to a continuous method of manufacturing water gas involving reaction of carbon with steam to produce carbon monoxide.

In accordance with the invention a solid carbonaceous material such as coke is converted to the form of a fine powder and this fine powder is dispersed in a stream of air or other oxygen-bearing gas capable of supporting combustion under conditions such that a small portion of carbon undergoes combustion, the heat of combustion being used to raise the remainder of the powder to a temperature suitable for effecting the water gas reaction.

A stream of heated powder is continuously withdrawn from a combustion zone and dispersed or suspended in a stream of steam and the resulting fluid mixture passed through a reaction zone wherein carbon is converted to carbon monoxide. A gaseous stream of reaction products containing water gas and unconverted carbon powder suspended therein is drawn off from the reaction zone. This withdrawn stream is passed through a separator wherein suspended powder is separated from the gaseous products, which latter are discharged from the system. The separated and unconverted powder is returned to the combustion zone.

An important advantage of the process of this invention resides in the continuity of flow as contrasted with the intermittent type of operation used heretofore. Previously it has been the practice to charge a batch of coke or carbonaceous material to a reaction vessel and blast the charge with air for a period of time sufficient to raise the mass of incandescence. Thereupon the flow of air is discontinued temporarily and a stream of steam is passed through the highly heated mass of carbon under conditions such that carbon is oxidized to form carbon monoxide. The flow of steam is continued through the hot mass until the temperature of the mass is reduced to a point at which the water gas reaction is no longer operative. Thereupon the flow of oxygen or air through the mass is resumed so as to again restore it to a state of incandescence.

The present invention avoids this intermittent type of operation with its widely fluctuating temperatures and so permits the continuous production of a stream of carbon monoxide and hydrogen suitable as synthesis gas for catalytic conversion into hydrocarbons or alcohols.

It permits continuously supplying to the synthetic reaction, powdered carbon at a uniform temperature level, preferably not substantially in excess of about 1800° F. and below that temperature at which clinker formation becomes a problem during either the combustion of the carbon or during the subsequent water gas reaction.

A feature of the invention resides in employing powdered carbon of a high degree of fineness in the water gas reaction stage. The carbon particles are materially reduced in size as a result of partial combustion in the combustion zone and this facilitates the subsequent water gas reaction. Since unconverted powdered carbon leaving the water gas reaction stage is continuously recycled through the combustion zone, the decrease in particle size is progressive as a result of further burning action.

Dispersion of the powdered carbon in dust-like form in the air or oxygen-containing gas flowing through the combustion zone facilitates realizing partial though limited combustion of each individual carbon particle so that the combustion results in uniformly decreasing the size of all carbon particles passing through the combustion zone.

In order to describe the invention further reference will now be made to the accompanying drawing showing a flow diagram illustrative of one method of practicing the process.

In the drawing the numeral 1 refers to a burner in the form of a vertical vessel wherein the finely powdered carbon is brought into contact with a stream of air or other oxygen-bearing gas capable of supporting combustion.

The stream of oxygen-bearing gas such as air is continuously introduced to the bottom portion of the burner 1 through a pipe 2.

Coke or other solid carbonaceous material reduced to a fine powder of about 10 to 100 mesh is drawn from a storage hopper 3 to a feed hopper 4 which latter is immediately above the burner 1 and may be substantially integral therewith. A suitable valve 5 is provided in the conduit connecting the hopper 4 with the burner 1 through which the powdered carbon is conducted into the upper portion of the burner.

The rate of introduction of powder and also the rate of introduction of air to the burner 1 is regulated so that the powder is widely dispersed in the gases within the burner 1. Conditions are maintained so that some combustion of carbon occurs within the mass of gas and suspended carbon powder. The proportion of carbon so burned ranges from about 20 to 40% by weight of the total carbon powder introduced to the burner 1. As a result of combustion the unconverted and major proportion of the carbon powder is raised to approximately the temperature of combustion prevailing within the burner 1 and accumulates in the conical bottom portion of the burner.

From the bottom of the burner 1 this hot carbon powder flows into a standpipe 6 provided with a suitable control valve 7 which standpipe communicates with a conduit 8 and to which reference will be made later.

The gaseous products of combustion or flue gas formed in the burner 1 are continuously discharged from the upper portion thereof through a conduit 10 leading to a dust separator 11 wherein entrained carbon powder is separated by centrifugal action or by other mechanisms which may involve electrical precipitation.

At any rate the flue gas substantially free from carbon powder is continuously discharged through a pipe 12.

Since the effluent gas stream flowing through pipe 10 may contain a substantial amount of ash, it is advantageous to provide dust separating apparatus such that the entrained carbon powder is separately removed from the gas stream. The ash may remain in the gas stream for discharge from the system through the pipe 12, or means may be provided to effect its removal in a separate stage, especially where the effluent gas is passed through waste heat recovery apparatus.

If desired all or a portion of the flue gas so discharged through pipe 12 may be by-passed through a branch pipe 13 leading to an exchanger 14 wherein the sensible heat of the flue gas is used to super-heat steam used in the conversion process.

Thus, steam may be conducted from a source not shown through a pipe 15 communicating with the steam side of the exchanger 14 and from which the super-heated steam is conducted through a pipe 16.

While an exchanger has been mentioned, nevertheless it will be understood that a waste heat boiler may be substituted in which case it may be used for converting a stream of water into super-heated steam which is passed into the previously mentioned pipe 16.

The carbonaceous material separated from the flue gas in the separator 11 is dropped into a hopper 17 which also communicates through a standpipe 18 with the previously mentioned conduit 8. The standpipe 18 is also provided with a control valve 19.

Steam is introduced from the pipe 16 to the conduit 8 and as it flows through the conduit picks up the powdered carbon introduced from the standpipes 18 or 6 or from both of them and the resulting suspension of steam and solid carbon particles is conducted through the conduit 8 to a lower portion of a water gas reactor 20.

The powdered carbon suspended in the stream of steam flowing through the conduit 8 is already at an elevated temperature in the range about 1500 to 2000° F. and preferably in the range about 1500 to 1800° F., within which the water gas reaction proceeds.

Consequently, during passage through the conduit 8 and the reactor 20, carbon undergoes conversion to carbon monoxide with accompanying reduction of the steam to free hydrogen.

The steam and powdered carbon may be introduced to the conduit 8 in approximately molecular proportions although if desired excess steam may be present in order to facilitate transporting the hot particles of carbon powder into the reactor 20.

As previously indicated the powder is of a high degree of fineness at this stage and it is preferred to effect the water gas reaction in the substantial absence of particles having a diameter of as great as ⅛ inch. Preferably the powder in this stage is at least sufficiently fine to pass through a sieve of about 15 to 200 mesh.

The stream of water gas containing unconverted carbon leaves the reactor 20 through a conduit 21 which leads to a separator 22 which may be of the cyclone type.

The separator 22 effects separation between the gaseous products of the reaction and the suspended carbon powder. The gaseous products of the reaction comprising carbon monoxide and hydrogen as well as some ash which may be present are continuously discharged from the separator 22 through a pipe 23, while the separated carbonaceous powder which accumulates in the bottom of the separator 22 and is substantially free of ash, is continuously drawn off through a conduit 24 leading to the previously mentioned feed hopper 4.

In this way unconverted powdered carbon is recycled through the system until completely consumed producing either flue gas or water gas as the case may be. Once the system is in operation it is merely sufficient to add make-up carbonaceous powder from the hopper 3 in an amount sufficient to compensate for the continual disappearance of carbon from the system in the form of flue gas or water gas.

The water gas being discharged through the pipe 23 is passed to a precipitator or scrubber 25 adapted to effect removal of ash. Electrical precipitation or scrubbing with a liquid or spray may be used for this purpose. The water gas may be subjected to purification treatments to remove sulfur compounds that may be present. The desulfurized water gas may then be passed to a catalytic reaction zone wherein the carbon monoxide is hydrogenated to produce synthetic hydrocarbons.

Obviously many modifications and variations of the invention as above set forth may be made without departing from the spirit and scope thereof, and therefore only such limitations should be imposed as are indicated in the appended claims.

I claim:

1. A continuous method of producing carbon monoxide and hydrogen from a solid carbonaceous material which comprises converting said material to finely powdered form, introducing said powder to a vertical combustion zone, introducing to the lower portion of said zone a stream of oxygen-containing gas, passing said gas upwardly through the combustion zone in contact with said powder so that powder is maintained dispersed in gas within said zone, effecting partial combustion of said powder with accompanying decrease in particle size and formation of ash, discharging from the upper portion of said zone a stream of hot combustion gas containing entrained hot carbonaceous particles and ash, separating entrained hot carbonaceous particles from said discharged gas and ash, passing said residual hot gas stream in indirect contact with a stream of steam, injecting said separated hot particles in the resulting heated stream of steam, continuously withdrawing hot carbonaceous particles from the bottom of said combustion zone, injecting said withdrawn hot carbonaceous particles into said heated stream of steam, passing the resulting hot mixture of steam and injected particles upwardly through a vertical reaction zone, reacting said carbonaceous particles with steam at a temperature of about 1500° F. and above in said reaction zone so as to form carbon monoxide and hydrogen, removing from the upper portion of said reaction zone an effluent stream of carbon monoxide and hydrogen containing entrained particles of unconsumed carbonaceous material and ash, separating entrained unconsumed carbonaceous material from said carbon monoxide, hydrogen and ash, recycling separated unconsumed carbonaceous material to said combustion zone and separating ash from said effluent stream of gas so as to provide a gaseous mixture comprising mainly carbon monoxide and hydrogen.

2. A continuous method of producing carbon monoxide and hydrogen from a solid carbonaceous material which comprises converting said carbonaceous material to finely powdered form, continuously introducing said powder to the upper portion of a vertical combustion zone, continuously introducing to the lower portion of said zone a stream of oxygen-containing gas, passing said gas upwardly through said combustion zone in contact with said powder so that powder is maintained dispersed in gas within said zone, effecting partial combustion of said particles with accompanying decrease in particle size and formation of ash, discharging from the upper portion of said zone a stream of hot combustion gas containing entrained hot carbonaceous particles and ash, separating said entrained carbonaceous particles from said combustion gas and ash, passing residual hot gas stream in indirect heat exchange with steam so as to superheat the steam, injecting said separated hot particles in resulting superheated steam, continuously withdrawing carbonaceous particles from the bottom of said combustion zone at an elevated temperature substantially above 1500° F., injecting said withdrawn carbonaceous particles into said superheated steam, passing resulting mixture of steam and injected particles upwardly through a vertical reaction zone, reacting said carbonaceous particles with steam at a temperature of about 1500° F. and above in said reaction zone so as to form carbon monoxide and hydrogen, removing from the upper portion of said reaction zone an effluent stream of carbon monoxide and hydrogen containing entrained particles of unconsumed carbonaceous material, separating said unconsumed particles from the effluent stream and recycling said separated unconsumed particles to said combustion zone.

3. The method according to claim 2 in which the carbonaceous material is converted to a powder of about 10 to 100 mesh prior to its introduction into the vertical combustion zone.

4. A continuous method of producing carbon monoxide and hydrogen from a solid carbonaceous material which comprises converting said carbonaceous material to finely powdered form, introducing said powder to a vertical combustion zone, continuously introducing to the lower portion of said zone a stream of oxygen-containing gas, passing said gas upwardly through said combustion zone in contact with said powder so that powder is maintained dispersed in gas within said zone, effecting partial combustion of said powder with accompanying decrease in particle size and formation of ash, discharging from the upper portion of said zone a stream of hot combustion gas containing entrained hot carbonaceous particles and ash, separating entrained hot carbonaceous particles from said discharged gas and ash, suspending said separated hot particles in steam, continuously withdrawing hot carbonaceous particles from the bottom of said combustion zone, suspending said withdrawn hot carbonaceous particles in said steam, passing resulting mixture of steam and particles suspended therein upwardly through a vertical reaction zone, reacting said carbonaceous particles with steam at a temperature of about 1500° F. and above in said reaction zone so as to form carbon monoxide and hydrogen, removing from the upper portion of the reaction zone an effluent stream of carbon monoxide and hydrogen containing entrained particles of unconsumed carbonaceous material, separating said unconsumed particles from the effluent stream and recycling separated particles to said combustion zone.

HAROLD V. ATWELL.

REFERENCES CITED

The following references are of record in the file of this patent:

FOREIGN PATENTS

| Number | Country | Date |
|---|---|---|
| 23,045 | Great Britain, 1910 | Aug. 24, 1911 |
| 318,016 | Great Britain | Aug. 29, 1929 |
| 564,870 | Germany | Nov. 24, 1932 |
| 632,466 | France | Oct. 10, 1927 |

OTHER REFERENCES

Haslam and Russell, "Fuels and Their Combustion," pp. 140, 600-601.